(12) United States Patent
Buck et al.

(10) Patent No.: US 11,946,805 B2
(45) Date of Patent: Apr. 2, 2024

(54) SPECTROMETER APPARATUS AND A CORRESPONDING METHOD FOR OPERATING A SPECTROMETER APPARATUS

(71) Applicant: Robert Bosch GmbH, Stuttgart (DE)

(72) Inventors: Thomas Buck, Tamm (DE); Martin Husnik, Stuttgart (DE); Christian Huber, Ludwigsburg (DE); Marc Schmid, Weissach (DE); Benedikt Stein, Stuttgart (DE); Christoph Daniel Kraemmer, Malsch (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 17/296,050

(22) PCT Filed: Nov. 11, 2019

(86) PCT No.: PCT/EP2019/080799
§ 371 (c)(1),
(2) Date: May 21, 2021

(87) PCT Pub. No.: WO2020/108967
PCT Pub. Date: Jun. 4, 2020

(65) Prior Publication Data
US 2022/0003601 A1    Jan. 6, 2022

(30) Foreign Application Priority Data
Nov. 29, 2018    (DE) ............ 10 2018 220 601.5

(51) Int. Cl.
*G01J 3/10*    (2006.01)
*G01J 3/02*    (2006.01)
(Continued)

(52) U.S. Cl.
CPC ............ *G01J 3/10* (2013.01); *G01J 3/0272* (2013.01); *G01J 3/0297* (2013.01); *G01J 3/26* (2013.01);
(Continued)

(58) Field of Classification Search
CPC .......... G01J 3/10; G01J 3/0272; G01J 3/0297; G01J 3/26; G01J 2003/1213; G01N 21/255
See application file for complete search history.

(56) References Cited

U.S. PATENT DOCUMENTS 6,045,502 A       4/2000 Eppstein et al.
6,758,640 B2 *    7/2004 Mizutani ............ B23Q 17/2241
                                                      408/710
(Continued)

FOREIGN PATENT DOCUMENTS

DE    10 2017 202 661 A1    8/2018
EP       1 314 972 A1       5/2003

OTHER PUBLICATIONS

International Search Report corresponding to PCT Application No. PCT/EP2019/080799, dated Feb. 11, 2020 (German and English language document) (5 pages).

*Primary Examiner* — Michelle M Iacoletti
*Assistant Examiner* — Kemaya Nguyen
(74) *Attorney, Agent, or Firm* — Maginot, Moore & Beck LLP

(57) ABSTRACT

A spectrometer apparatus is disclosed that includes at least one light source for irradiating a sample with light, an optical detection device for detecting light scattered by the sample, at least one optical filter device, which is arranged in front of and/or behind the sample, a contact sensor device for determining a contact between the sample and the spectrometer apparatus and for outputting a corresponding output signal, a control device for controlling the light (Continued)

source and the detection device in response to the output signal. The control device is designed such that the control device modifies at least one operating parameter of the light source and the detection device, when the output signal indicates the contact between the sample and the spectrometer apparatus. A method for operating a spectrometer apparatus is disclosed as well.

9 Claims, 3 Drawing Sheets

(51) Int. Cl.
*G01J 3/26* (2006.01)
*G01N 21/25* (2006.01)
*G01J 3/12* (2006.01)

(52) U.S. Cl.
CPC .... *G01N 21/255* (2013.01); *G01J 2003/1213* (2013.01)

(56) References Cited

U.S. PATENT DOCUMENTS

| | | | |
|---|---|---|---|
| 6,844,931 B2 * | 1/2005 | Ehbets | G01J 3/501 356/406 |
| 7,061,619 B2 | 6/2006 | Shirai et al. | |
| 7,219,086 B2 * | 5/2007 | Geshwind | G01J 3/021 382/165 |
| 9,995,623 B2 * | 6/2018 | Walters | G01J 3/12 |
| 10,335,087 B2 * | 7/2019 | Lee | A61B 5/742 |
| 2009/0073421 A1 | 3/2009 | Jung et al. | |
| 2010/0238437 A1 * | 9/2010 | Hicks | G01J 3/0264 356/311 |
| 2012/0147376 A1 | 6/2012 | Jung et al. | |
| 2016/0026219 A1 * | 1/2016 | Kim | H04M 1/0245 345/173 |
| 2016/0282182 A1 | 9/2016 | Kanai | |

* cited by examiner

SPECTROMETER APPARATUS AND A CORRESPONDING METHOD FOR OPERATING A SPECTROMETER APPARATUS

This application is a 35 U.S.C. § 371 National Stage Application of PCT/EP2019/080799, filed on Nov. 11, 2019, which claims the benefit of priority to Serial No. DE 10 2018 220 601.5, filed on Nov. 29, 2018 in Germany, the disclosures of which are incorporated herein by reference in their entirety.

The present disclosure relates to a spectrometer apparatus and to a corresponding method for operating a spectrometer apparatus.

BACKGROUND

In many scientific fields spectrometers are indispensable when used for analyzing samples of any type. In recent years the trend has been toward miniaturizing spectrometers because that enables them to be used more flexibly. Spectrometers generally consist of a light source, a spectral filter and a detector. In this case, the filter is positioned between light source and sample or between sample and detector. In this regard, the U.S. Pat. No. 7,061,619 B2 describes a miniaturized spectrometer.

As cellphones and smartphones begin more widespread, the idea thus arose of integrating a spectrometer into a handheld device. Therefore, the spectrometer could also be used in mobile, portable fashion and detected spectra could be stored e.g. in a Cloud in a manner freely accessible to any user. In this way spectra could be used for comparative analysis in order to determine the ripeness of fruit, for example. In a further step, intelligent algorithms could use the stored spectra in order to realize machine vision e.g. in the field of robotics. However, these applications presuppose spectra that have been detected without errors, which conventionally has been possible only when done by a trained person. However, the new applications demand in advance detection even by untrained persons.

In order to increase the reliability of detected spectra and to avoid sources of errors, a contact between spectrometer and sample may be advantageous. For example, the US patent publication U.S. Pat. No. 6,045,502 A describes a spectrometer which is in contact with the sample via an index matching agent. This agent, often in the form of a gel, is used in order to avoid unwanted reflections that could corrupt the spectrum.

FIGS. 3a)-3b) are schematic illustrations of a typical spectrometer apparatus with sample.

In this regard, the spectrometer apparatus 30 in FIG. 3a) comprises a sample 31 positioned in front of a detection device 32, an optical filter device 33 and a light source 34. In this example, the optical filter device 33 is positioned directly in front of the light source 34, such that what impinges on the sample 31 is only ever filtered, generally narrowband optical radiation. Part of the radiation that is reflected by the sample and possibly excited impinges on the detection device 32, which can then detect a spectrum of the sample.

As a set-up variant, FIG. 3b) shows a spectrometer apparatus 30' in which the optic filter device 33 is not positioned in front of the light source 34, but rather in front of the detection device 32. In this regard, the full spectrum of the generally broadband light source impinges on the sample 31 simultaneously, and the radiation that is reflected by the sample 31 and possibly excited is filtered before it impinges on the detection device 32.

SUMMARY

The disclosure provides a spectrometer apparatus as described below and a corresponding method for operating a spectrometer apparatus as also described below.

For simplified handling, it is desirable to dispense with an index matching agent for contact-making purposes. Moreover, the miniaturized spectrometers should be configured such that detection parameters such as the measurement duration or the illuminance can be adapted depending on the existence of contact. Alternatively, the spectra should at least be provided with an identification revealing whether the spectrum was detected with contact existing between sample and spectrometer.

The concept underlying the present disclosure resides in providing a spectrometer apparatus with a contact identification. Depending on contact existing between sample and spectrometer, it is possible to adapt operating parameters that take account of the existing contact. In this regard, in the case where contact exists, the scattered light is generally shielded, which results in a higher signal-to-noise ratio. In this regard, under certain circumstances, a reduced measurement duration or a reduced illuminance is sufficient for detecting reliable spectra. Conversely, these parameters should be increased, under certain circumstances, in the case where contact is absent.

In accordance with one preferred development, the control device is designed such that the detection of the spectrum is activated only in the case where contact between the spectrometer apparatus and the sample is present.

This development affords the advantage of a higher reliability of the detected spectra. In this regard, a detected spectrum can be detected without errors more easily with contact present because in the case of nontransparent samples scattered light and also other environmental influences which could corrupt the measurement data are shielded. In this regard, it becomes possible even for untrained users to detect a spectrum with high reliability.

In accordance with a further preferred development, the control device is designed such that the detection of the spectrum is activated with higher or lower illuminance in the case where contact between the spectrometer apparatus and the sample is present compared with the case where contact is absent. The existing contact is generally associated with a shielding which, in the case of a nontransparent sample, no longer allows scattered light to penetrate into the spectrometer apparatus, and also no longer allows emitted light from the light source to penetrate toward the outside. Therefore, the existing contact allows a limit value of the illuminance defined by safety specifications to be exceeded, which would otherwise be dangerous for the human eye. With the increased illuminance, the signal-to-noise ratio and thus the accuracy of the detected spectrum can be improved. A lower illuminance affords the advantage of saving energy during the operation of the spectrometer.

In accordance with a further preferred development, the control device is designed such that in the case where contact between the spectrometer apparatus and the sample is absent, an indication signal able to be output to the user. Said indication signal can be used, in the case where contact is absent, to request the user to reduce the illuminance because it is above the permissible limit value. Moreover, it gives the user an opportunity to correct the positioning of the sample with respect to the spectrometer apparatus in order to establish a contact. This ensures that the user does not mistakenly detect a spectrum in the case where contact is absent, where the user actually wanted to record a spectrum with contact existing.

In accordance with a further preferred development, the control device is designed such that in the case where contact between the spectrometer apparatus and the sample exists, a label designating the contact is able to be assigned to the spectrum.

Said label gives information about the reliability of the detected spectrum because it is assumed that a spectrum detected in the case where contact exists has greater reliability than a spectrum detected in the case where contact is absent. Therefore, this development enables differentiation of the spectra according to reliability in e.g. a database, which is important for a comparative analysis with a different spectrum from a similar sample.

In accordance with a further preferred development, the operating parameter comprises the measurement duration and/or the scan time. This development enables the measurement duration and/or the scan time to be adapted according to the output signal in order to ensure a sufficiently large signal-to-noise ratio. In this regard, in the case where contact between sample and spectrometer apparatus is present, what is required generally is a shorter measurement duration and/or scan time, as a result of which time for detecting a spectrum is saved overall.

In accordance with a further preferred development, the spectrometer apparatus is integrated into a cellphone, a smartphone or some other handheld device. This integration facilitates the use of the spectrometer apparatus to a considerable degree. In this regard, use is made possible even in mobile, portable fashion. e.g. at difficult-to-access locations. Therefore, samples need no longer only be brought to the spectrometer apparatus, rather the spectrometer apparatus can also be brought to the sample. That allows e.g. the detection of spectra of plants at their original location in natural surroundings. That makes it possible e.g. to determine the degree of ripeness of a fruit before the fruit has been harvested.

In accordance with a further preferred development, the contact sensor device contains a proximity switch, an ambient light sensor, an inertia sensor, and/or a camera. The use of one or more of the devices mentioned increases the reliability of the contact identification and reduces the probability of a misinterpretation. In this case, the proximity switch can be an inductive proximity switch, a capacitive proximity switch, a magnetic proximity switch (e.g. a reed switch or a reed contact, or else Hall sensor), an optical proximity switch, a light barrier or an ultrasonic proximity switch or a micro-pushbutton, which closes an electrical contact upon surface contact. With the light source switched off or modulated, the ambient light sensor can deduce darkness, whereby a contact is identified. In the case of the inertia sensor, the state of whether the contact between spectrometer apparatus and sample exists can be deduced by means of a signal analysis of e.g. an acceleration spectrum. With the camera, a contact can be deduced by direct observation.

In accordance with a further preferred development, the light source comprises an incandescent lamp, a thermal emitter, an LED, an LED with phosphor light source, a white light laser, a quantum dot light source, a white light source, a gas discharge lamp or some other broadband light source. This development makes it possible to detect a spectrum over a wide wavelength or frequency range. A larger range generally makes it possible to gather more information from the sample.

In accordance with a further preferred development, the filter device comprises a Fabry-Pérot interferometer or an optical grating device.

This device enables the optical radiation to be spectrally filtered effectively and in a tunable manner, as a result of which a spectrum can be detected with high spectral resolution. It is thereby possible generally to gather more information from the sample.

In accordance with a further preferred development, the contact sensor device is provided separately from the spectrometer apparatus.

In this development, the contact sensor device is not connected to the spectrometer apparatus, but rather can be installed in a separate part of a superordinate device, such as a smartphone. That makes it possible to use components already present in the device for the contact sensor device.

In accordance with a further preferred development, the detection of the spectrum is activated only in the case where contact between the spectrometer apparatus and the sample is present.

This development likewise affords the advantage of a higher reliability of the detected spectra. In this regard, a detected spectrum can be detected without errors more easily with contact present because scattered light and other environmental influences that could corrupt the measurement data are shielded. In this regard, it becomes possible even for untrained users to detect a spectrum with high reliability.

In accordance with a further preferred development, the detection of the spectrum is activated with higher illuminance in the case where contact between the spectrometer apparatus and the sample is present compared with the case where contact is absent. Here the existing contact with a nontransparent sample and the associated shielding likewise allow a limit value of the illuminance defined by safety specifications to be exceeded, which would otherwise be dangerous for the human eye. With the increased illuminance, the signal-to-noise ratio and thus the accuracy of the detected spectrum can be improved.

In accordance with a further preferred development, in the case where contact between the spectrometer apparatus and the sample is absent, an indication signal is output to the user. Said indication signal can be used, in the case where contact is absent, to request the user to reduce the illuminance because it is above the permissible limit value. Moreover, it gives the user an opportunity to correct the positioning of the sample with respect to the spectrometer apparatus in order to reestablish a contact. This ensures that the user does not mistakenly detect a spectrum in the case where contact is absent, ere the user actually wanted to record a spectrum with contact existing.

BRIEF DESCRIPTION OF THE DRAWINGS

Further features and advantages of the present disclosure are explained below on the basis of embodiments with reference to the figures.

In the figures.

DETAILED DESCRIPTION

In the figures, identical reference signs designate identical or functionally identical elements.

Figure 1:
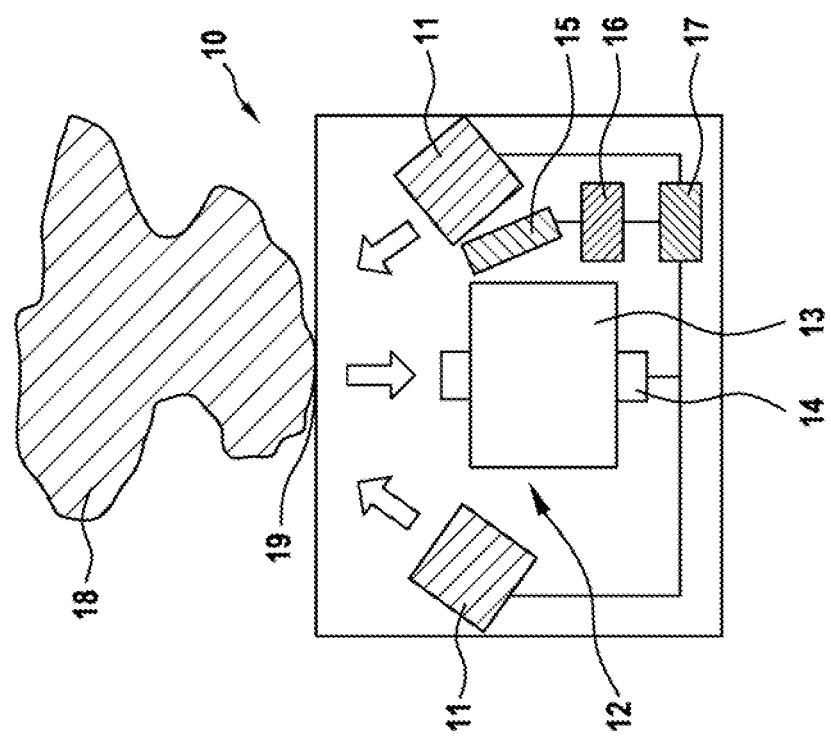
FIG. 1) shows a schematic illustration of the spectrometer apparatus with sample in accordance with a first embodiment of the disclosure.

FIG. 1) is a schematic illustration of the spectrometer apparatus with sample in accordance with a first embodiment of the present disclosure.

In the illustration in FIG. 1), the spectrometer apparatus 10 contains two light sources 11, a detection device 12 comprising an optical filter device 13 and a photodetector 14, a contact sensor device 15, 16 comprising an ambient light sensor 15 and an inertia sensor 16, and a control device 17, which is connected to the contact sensor device 15, 16, the detection device 12 and the light sources 11. In this case, a sample 18 is in contact 19 with the spectrometer apparatus 10, which means that the sample 18 physically touches the spectrometer apparatus 10, or is positioned very close to it.

The two light sources 11 illustrated here are angled such that an illumination field overlaps e.g. a window (not illustrated) of the spectrometer apparatus 10, whereby the sample is illuminated. The radiation that is reflected by the sample and possibly excited arrives in the filter device 13 of the detection device in part preferably through an optical unit. In this case, the filter device is constituted such that it can filter the radiation in a tunable manner in a defined wavelength range, such that what impinges on the photodetector 14 is only ever a narrowband range. By means of the tuning, the spectrum is finally detected in the defined wavelength range.

A field of view of the ambient light sensor 15 overlaps the illumination field of the light sources 15 and the window of the spectrometer apparatus 10. In this regard, in the case of contact 19 with a nontransparent sample 18 and light sources 11 switched off, ambient light practically no longer arrives in the spectrometer apparatus 10, for which reason the ambient light sensor 15, in the case of the nontransparent sample 18, identifies darkness. The inertia sensor 16 supports the measurement by making available an acceleration spectrum that can provide further information about a contact 19. In this regard, in the case where contact 19 exists, the acceleration spectrum may have fewer high-frequency excursions because the inertia has been increased as a result of the total mass of spectrometer apparatus 10 and sample 18. These data may be advantageous, particularly in the case or light-transmissive samples, for unequivocally determining a contact 19.

The control device 17 receives the data from the contact sensor device 15, 16 and correspondingly drives the light sources 11 and the detection device 12 and defines the operating parameters thereof. In general, the control device 17 increases the illuminance of the light sources 11 in the case where contact 19 exists. Conversely, in the case where contact is absent, the illuminance should be reduced below the limit value defined by safety specifications. The control device 17 generally drives the detection device 12 such that the measurement duration and/or the scan time are/is shorter in the case where contact exists compared with the case where contact is absent. This depends on the specific sample, however, e.g. whether it is at least partly light transmissive. Moreover, it is provided that the operating parameters are defined automatically, or can be manipulated by the user.

Figure 2:
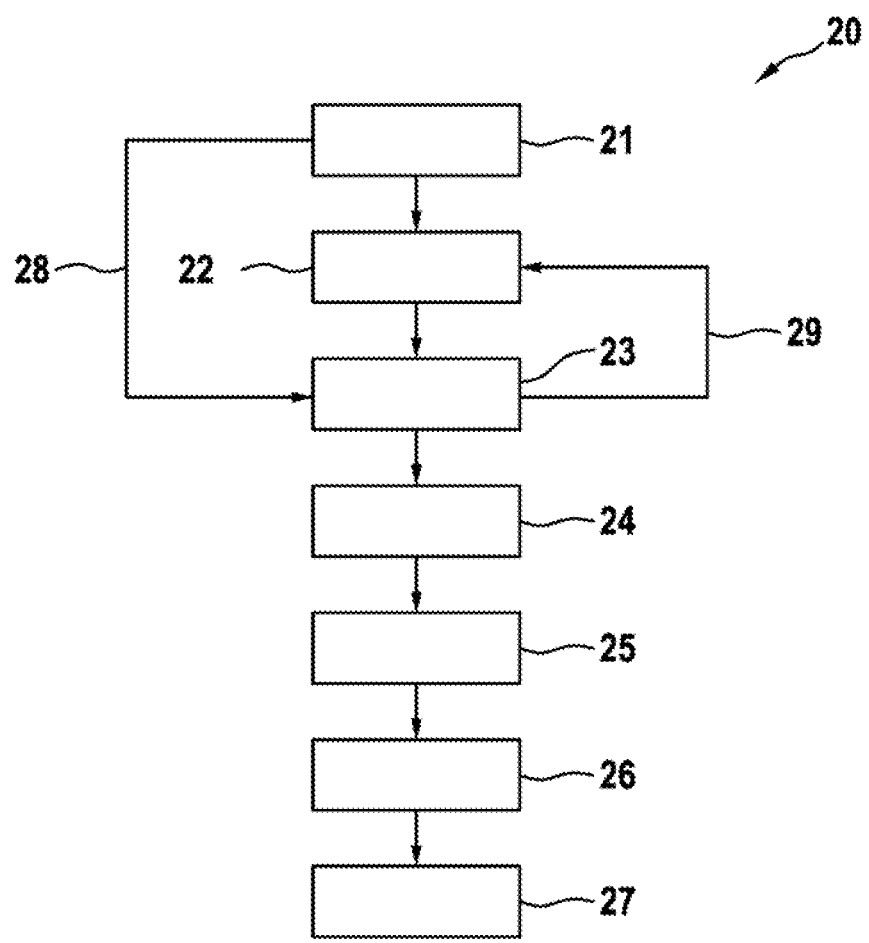
FIG. 2) shows a schematic illustration of the method for operating a spectrometer apparatus in accordance with the first embodiment of the disclosure.
Figure 3A:
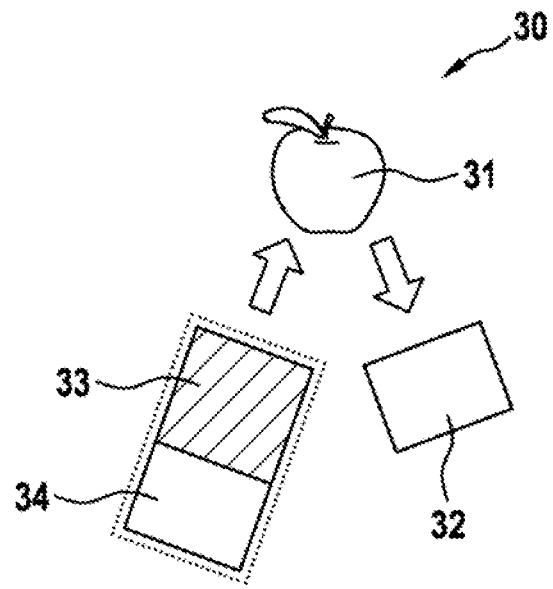
FIGS. 3a)-3b) show schematic illustrations of a typical spectrometer apparatus with sample.
Figure 3B:
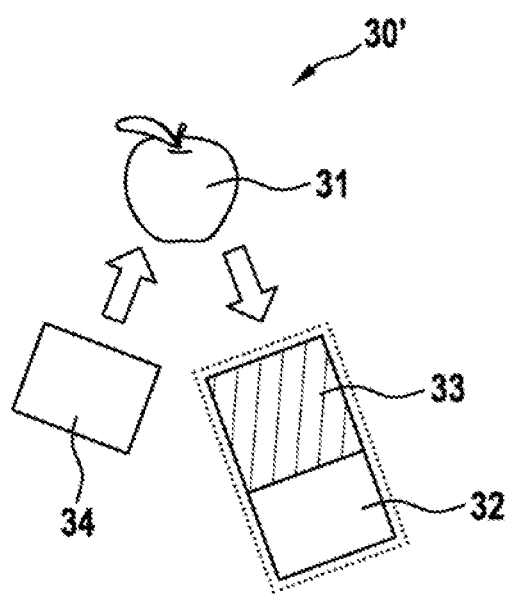

FIG. 2) is a schematic illustration of the method for operating a spectrometer apparatus in accordance with the first embodiment of the present disclosure.

The method 20 for operating the spectrometer apparatus 10 begins with a classification 21 of the sample. The sample is then positioned 22 relative to the spectrometer apparatus 10. Afterward, the contact sensor device 15, 16 determines 23 whether a contact 19 between spectrometer apparatus 10 and sample 18 exists. In the case where contact 19 exists, the illuminance of the at least one light source is increased or maximized 24. In addition, the other measurement parameters such as the measurement duration and/or the scan time are adapted 25 before the spectrum of the sample 18 is detected 26 by the detection device 12. Finally, an identification 27 of the detected spectrum is performed, which can include the type of sample and/or the information as to whether the sample was detected with contact existing.

During the classification 21 of the sample 18, a contact threshold value used to determine 23 a contact 19 can be adapted 28. In this regard, for example, an inertia sensor identifies a contact 19 with greater difficulty in the case of soft sample materials, such as e.g. textiles, compared with hard and heavy samples 18. Moreover, during the step of determining 23 the contact 19 and ascertaining an absent contact 19, the user may be requested 29 to reposition the spectrometer apparatus relative to the sample.

Although the present disclosure has been described on the basis of preferred exemplary embodiments, it is not restricted thereto. In particular, the materials and topologies mentioned are merely by way of example and not restricted to the examples explained.

In particular, it is possible to choose other inclination directions, angles, geometries, etc. for the individual elements. Elements and components can also be arranged in any other expedient way.

The invention claimed is:

1. A spectrometer apparatus comprising:
   at least one light source configured to irradiate a sample with light;
   an optical detector configured to detect the light scattered by the sample;
   at least one optical filter device arranged in front of and/or behind the sample,
   a contact sensor configured to determine a contact between the sample and the spectrometer apparatus and to output a corresponding output signal;
   a control device configured to control the light source and the optical detector in response to the output signal;
   wherein the control device is configured to activate the optical detector to detect the light scattered by the sample only when the output signal indicates the contact between the sample and the spectrometer apparatus is present and to deactivate the optical detector when the output signal indicates that contact between the spectrometer apparatus and the sample is absent such that the spectrometer apparatus takes measurements of the light scattered only when the output signal indicates the contact is present, and
   wherein the control device is further configured to output an indication signal to a user when the output signal indicates that contact between the spectrometer apparatus and the sample is absent.

2. The spectrometer apparatus as claimed in claim 1, wherein the control device is designed such that in the case where contact between the spectrometer apparatus and the sample exists, a label designating the contact is assigned to the detected light.

3. The spectrometer apparatus as claimed in claim 1, wherein the operating parameter comprises the measurement duration and/or the scan time.

4. The spectrometer apparatus as claimed in claim 1, wherein the spectrometer apparatus is integrated into a cellphone, a smartphone or other handheld device.

5. The spectrometer apparatus as claimed in claim 1, wherein the contact sensor contains a proximity switch, an ambient light sensor, an inertia sensor, and/or a camera.

6. The spectrometer apparatus as claimed in claim 1, wherein the light source comprises an incandescent lamp, a thermal emitter, an LED, an LED with phosphor light source, a white light laser, a quantum dot light source, a white light source, a gas discharge lamp or another broadband light source.

7. The spectrometer apparatus as claimed in claim 1, wherein the filter device comprises a Fabry-Perot interferometer or an optical grating device.

8. The spectrometer apparatus as claimed in claim 1, wherein the contact sensor is provided separately from the spectrometer apparatus.

9. A method for operating a spectrometer apparatus comprising the following steps:
   positioning the spectrometer apparatus relative to a sample;
   checking for existence of a contact between the spectrometer apparatus and the sample with a contact sensor; and
   activating an optical detector of the spectrometer apparatus to detect light from a light source of the spectrometer apparatus scattered by the sample only when the contact between the spectrometer apparatus and the sample is present and deactivating the optical detector when the output signal indicates that contact between the spectrometer apparatus and the sample is absent such that the spectrometer apparatus takes measurements of the light scattered only when the output signal indicates the contact is present; and
   when contact between the spectrometer apparatus and the sample is absent, outputting an indication signal to a user.

* * * * *